United States Patent [19]

Bartos et al.

[11] 4,026,268

[45] May 31, 1977

[54] SOLAR ENERGY COLLECTOR

[75] Inventors: Donald M. Bartos; Cedric G. Currin, both of Midland, Mich.

[73] Assignee: Dow Corning Corporation, Midland, Mich.

[22] Filed: Sept. 29, 1975

[21] Appl. No.: 617,551

[52] U.S. Cl. ............................... 126/270; 126/271
[51] Int. Cl.² ............................................ F24J 3/02
[58] Field of Search ............ 237/1 A; 126/270, 271

[56] References Cited
UNITED STATES PATENTS

| | | | |
|---|---|---|---|
| 2,907,318 | 10/1959 | Awot | 126/271 |
| 3,076,450 | 2/1963 | Gough et al. | 126/271 |
| 3,215,134 | 11/1965 | Thomason | 126/271 |
| 3,889,742 | 6/1975 | Rush et al. | 126/271 X |
| 3,918,430 | 11/1975 | Stout et al. | 126/271 |

*Primary Examiner*—Kenneth W. Sprague
*Attorney, Agent, or Firm*—Howard W. Hermann

[57] ABSTRACT

A solar energy collector is made up of a first flat flexible sheet preferably of silicone, and a first sinuous sheet also preferably of silicone, sealingly adhered to the first sheet along a plurality of spaced parallel lines to provide a series of substantially parallel ducts which carry a liquid heat transfer medium. Either the first flat sheet or first sinuous sheet incorporates solar energy absorbent material. A backing member which may include a sheet of reflective foil and a layer of foam insulation is adhered to the opposite side of the first sinuous sheet to form a plurality of substantially parallel air channels under the ducts. Desirably, a solar window which includes a second sinuous sheet with a second flat sheet adhered to the upper amplitudes thereof is adhered to the first flat sheet along the lower amplitudes to space the second flat sheet from the first flat sheet thereby providing a multiplicity of insulative air channels.

4 Claims, 1 Drawing Figure

U.S. Patent      May 31, 1977      4,026,268
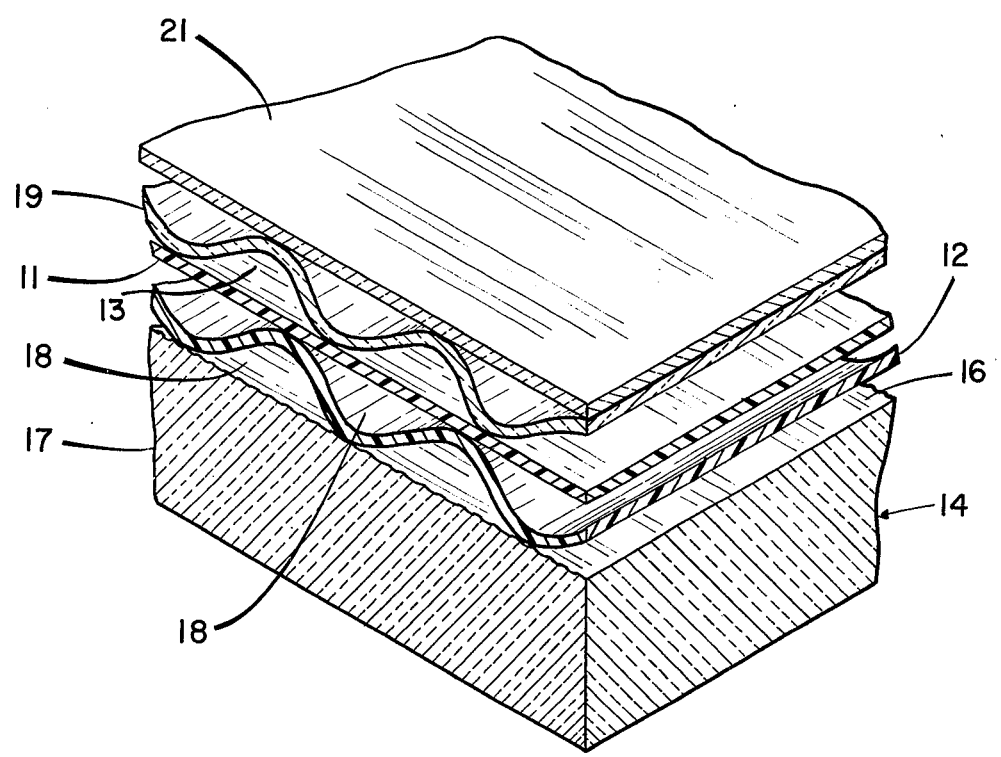

SOLAR ENERGY COLLECTOR

BACKGROUND OF THE INVENTION

The present invention relates to solar energy collectors and particularly to solar windows and solar absorbing elements which make use of fluids as a heat transfer medium.

Many systems have been proposed for collecting and converting energy from the sun as an alternative to the use of fossil fuels for energy generation. With rising costs of fossil fuels the collection of solar energy provides an attractive alternative. However, a major drawback so far of large-scale solar energy use has been the initial cost of installation and relative inefficiencies of collection. Glass elements are difficult to fabricate and are subject to breakage due to vandalism, accident during installation, breakage by hail storms, and thermal stresses introduced by shadows. Furthermore, they are heavy and require substantial labor and construction. While various configurations using plastic materials have been proposed none to date has been commercially significant. The present invention is directed toward providing a simple, inexpensive, durable solar energy collector panel.

SUMMARY OF THE PRESENT INVENTION

The present invention comprises a solar energy collector in which flexible sheets, desirably of silicone rubber or silicone resin material form the collector element. A series of substantially parallel liquid heat transfer containing ducts are formed by adhering a first sinuous sheet of flexible material to a first flat flexible sheet of material; one of said sheets incorporating solar energy absorbent material. A flexible backing member is adhered to the bottom of the ducts thereby forming a plurality of substantially parallel air channels underneath the ducts. The backing member may comprise a sheet of reflective foil for reflecting radiation toward the ducts and a layer of foam insulation below the foil. Desirably, a solar window is placed over the first flat flexible sheet and may comprise a construction similar to that of the ducts. That is, a second sinuous sheet of solar energy transmitting material adhered at its points of lowest amplitude to the first flat sheet and a second flat sheet of solar energy transmitting material adhered to the points of highest amplitude of the second sinuous sheet to thereby form a plurality of insulative air-containing chambers over the entire device.

All of the elements of the collector with the exception of the backing member are desirably made of silicone rubber or resin which may be reinforced with glass fibers, if desired. The solar energy transmitting elements are made of clear material and the solar energy absorbing element have incorporated therein or thereon dark pigment such as a combination of ferric oxide and carbon black.

The entire device is easily fabricated by calendaring the silicone rubber sheets and adhering the sheets together with silicone sealant to provide an integral device. The colletor element along with its backer element and insulative window can be simply rolled up and laid out by installers at the point where it is to be used. Installation personnel can walk on the panels during installation with little danger of breakage. Silicone materials by their nature are extremely resistant to the effects of weather and do not degrade as many other polymeric materials do. Thus, installation can take place with a minimum of labor and care and little maintenance is required after installation. The panel may be laid directly on the roof of a building or even over uneven ground and after the necessary plumbing installation is ready for use.

BRIEF DESCRIPTION OF THE DRAWINGS

Other objects and advantages of the present invention will become apparent to those skilled in the art from a study of the following detailed description when read in conjunction with the accompanying drawing, the sole FIGURE thereof being a perspective view partially in cross-section of a solar energy collector embodying the present invention.

DESCRIPTION OF PREFERRED EMBODIMENTS

Referring now to the drawing there is shown in the sole FIGURE thereof a solar energy collector embodying the present invention in which a first flat flexible sheet 11 is sealingly adhered to the uppermost portions of a first sinuous sheet 12 thereby forming a plurality of spaced substantially parallel ducts adapted to contain a heat transfer liquid medium 13. Either the sinuous sheet 12 or the flat sheet 11 is formed of solar energy absorbing flexible material such as a silicone rubber incorporating a black pigment of ferric oxide and carbon black. The heat transfer liquid medium 13 may be water or if freezing conditions are likely to be encountered a mixture of water and antifreeze solution such as ethylene glycol may be included, although the inherent flexibility of the device may allow freezing without damage.

Adhered to the lowermost portions of the sinuous sheet 12 is a backing member 14 which as shown comprises a metallic foil 16 which is adhered to the sinuous sheet 12 and optionally a layer of foam insulation 17. The sinuous configuration of the bottoms of the ducts forms with the backing member 14 a plurality of substantially parallel air channels 18 under the ducts to provide additional thermal insulation. If desired, it is possible to use circulating air through the air channels 18 and utilize heat carried by the air for added efficiency of the unit. The reflective foil 16, of course, serves the function of reflecting back to the energy absorbing element 12 any radiant energy which may reach it thereby also increasing efficiency.

It is desirable to provide additional thermal insulation over the surface of the collector in the form of a solar window element. Obviously, such thermal insulation must also be light transmitting if the energy is to reach the energy absorbing element 11 or 12. As shown in the FIGURE the solar window is provided by adhering to the surface of the first flat flexible sheet 11 a second sinuous sheet 19, preferably made of transparent silicone rubber or resin. Adhered to the uppermost portions of the second sinuous sheet 19 is a second flat sheet 21 which completely covers the other elements of the collector. Thus, this laminated configuration provides a series of air chambers above the channels carrying the heat transfer medium and prevents conduction of heat collected by the heat transfer medium 13 into the surrounding atmosphere.

The use of silicone rubbers or resins for the sheets 11, 12, 19 and 21 provides for extreme weatherability of the device. Similarly, the use of silicone adhesives to adhere the elements of the device together also adds to weatherability. Clear silicone rubber and resin materials comprising organopolysiloxanes reinforced with finely divided silica are commercially available as are clear room temperature vulcanizing silicone sealants. If desired, the sheets may be reinforced with a mesh of glass fibers for added strength. However, it should be realized that if reinforcement is used throughout the device it will become somewhat rigid and more difficult to roll for ease in transportation to the point of installation. Preferably, therefore, only the top sheet 21 and the sinuous sheets 12 and 19 are reinforced. The foil sheet 16, if included, is preferably a crimped aluminum foil to allow flexibility for rolling without tearing and the foam is an elastomeric foam, again for ease of rolling.

To manufacture the device as shown a layer of crimped aluminum foil is first adhered to the foam backing 17 if such foam backing is included. The additional materials are then adhered in sequential fashion to the backing member. Obviously, the entire fabrication process can be mechanized. Panels of collector elements are either rolled or transported flat to the site in which they are to be installed such as for example, the roof of a building and if a building roof is to be used the panels may simply be adhered to the roof with adhesive. If desired, a pressure sensitive adhesive can be applied to the back of the backing member 14 during fabrication of the device and covered with a release sheet of paper which is stripped prior to installation. After the panels are in place the necesary plumbing connections are made and the device is ready for use.

Obviously, modifications and variations of the device are contemplated to be within the scope of the present invention. For example, if adequate roof insulation is provided no foam backing insulation 17 is required on the device. While a particular type of solar window has been described it is to be understood that other types of solar windows can be placed over the surface of the ducts 13. Still other variations will become obvious to those skilled in the art from a consideration of the foregoing. Therefore, it is to be understood that within the scope of the appended claims the invention can be practiced otherwise than as specifically described.

That which is claimed is:

1. A solar energy collector comprising
a first flat flexible sheet of pigmented silicone material,
a first sinuous sheet of glass fiber reinforced silicone material sealingly adhered to said first flat sheet along a plurality of spaced substantially parallel lines to provide therewith a series of substantially parallel ducts to carry a liquid heat transfer medium,
a liquid heat transfer medium in said ducts for carrying heat away from said collector to a place of utilization,
a flexible backing member adhered to the bottoms of said ducts thereby forming a plurality of substantially parallel air channels under said ducts, said backing member including a sheet of reflective foil for reflecting radiation toward the ducts and a layer of foam insulation below the foil; and
a solar energy transmitting thermally insulating window adhered to said first flat sheet, said window comprising
a second sinuous sheet of solar energy transmitting material adhered to the upper surface of said first flat sheet at a plurality of spaced points and
a second flat sheet of solar energy transmitting material adhered at a plurality of points to said second sinuous sheet to completely cover the other elements of the collector.

2. A solar energy collector as defined in claim 1 wherein said second sinuous sheet and said second flat sheet are both of clear silicone material.

3. A solar energy collector comprising
a first flat flexible sheet,
a first sinuous sheet sealingly adhered to said first sheet along a plurality of spaced substantially parallel lines to provide therewith a series of substantially parallel ducts to carry a liquid heat transfer medium,
solar energy absorbing material incorporated in one of said first sheets,
a liquid heat transfer medium in said ducts for carrying heat away from said collector to a place of utilization,
a flexible backing member adhered to the bottoms of said ducts thereby forming a plurality of substantially parallel air channels under said ducts, and
a solar energy transmitting thermally insulating window, said window comprising
a second sinuous sheet of solar energy transmitting material adhered to the upper surface of said first flat sheet at a plurality of spaced points and
a second flat sheet of solar energy transmitting material adhered at a plurality of points to said second sinuous sheet to completely cover the other elements of the collector.

4. A solar energy collector as defined in claim 3 wherein said second sinuous sheet and said second flat sheet are both of clear silicone material.

* * * * *